United States Patent Office 3,539,557
Patented Nov. 10, 1970

3,539,557
9,10 - DIHYDRO - 13 - HYDROXY - 9,10(METHANO-IMINOMETHANO) ANTHRACEN - 11 - ONE AND ITS PREPARATION
Martin A. Davis, Montreal, Quebec, and Thomas A. Dobson, Dollard des Ormeaux, Quebec, Canada, assignors to Ayerst, McKenna & Harrison, Limited, St. Laurent, Quebec, Canada, a corporation of Canada
No Drawing. Filed Oct. 8, 1968, Ser. No. 765,972
Int. Cl. C07d 41/00
U.S. Cl. 260—239.3                    2 Claims

ABSTRACT OF THE DISCLOSURE

There is disclosed herein 9,10-dihydro-13-hydroxy-9,10 (methanoiminomethano)anthracen-11-one and a process for preparing it. The compound is useful as a central nervous system depressant and anticonvulsant agent, and methods for its use are also disclosed.

---

This invention relates to a novel chemical compound having useful biological properties and to the process used for its preparation. More specifically, this invention relates to the novel 9,10-dihydro-13-hydroxy-9,10(methanoiminomethano)anthracen-11-one of Formula I.

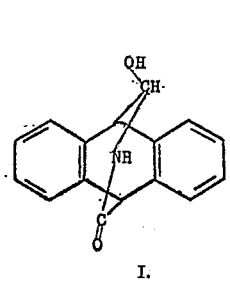

The novel compound of Formula I is obtained by the acidcatalysed rearrangement of 10,11-dihydro-10,11-epoxy-5H - dibenzo[a,d]cycloheptene - 5 - carboxamide of Formula II, prepared as described in U.S. Pat. 3,361,767. An example of the interaction of the epoxyamide (II) with dilute sulfuric acid has been described by T. A. Dobson et al. in Canad J. Chem. 46, (1968). In that instance, the action of the aqueous mineral acid serves to hydrate the 10,11-epoxy function and the resulting 10,11-dihydroxy derivative spontaneously loses ammonia to form 11 - hydroxy - 10,11 - dihydro - 10,5(epoxymethano) - 5H-dibenzo[a,d]cyclohepten-13-one. It is now found that the mineral acid causes, in part, rearrangement of the 10,11-epoxy function with concomitant contraction of the central seven-membered ring to form presumably the transient aldehyde derivative of Formula III. The formation of 9,10-dihydro-13-hydroxy-9,10(methanoiminomethano) anthracen-11-one of Formula I may then be explained by assuming rapid transannular interaction between the carboxamide and formyl functions to form the carbinolamide of Formula I. This product is isolated and purified by recrystallisation from a suitable solvent.

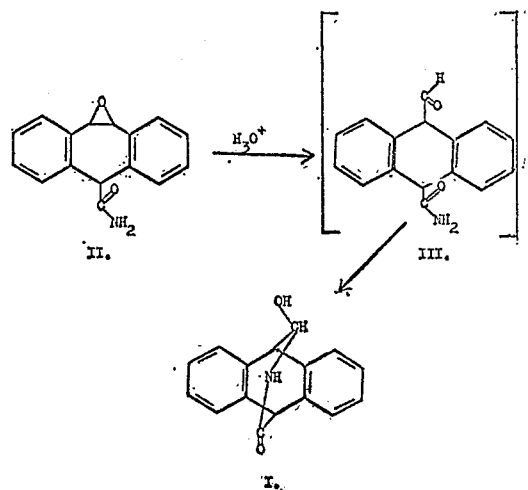

The novel compound of this invention has useful biological properties. In particular, the carbinolamide of Formula I exhibits central nervous system depressant effects in warm-blooded animals and is a central nervous system depressant. When administered to animals it causes a marked diminution of exploratory hypermotility. It also possesses a distinct effect in the runway test and potentiates the effect of alcohol narcosis. These tests are reliable indicators of central nervous system depressant activity. It is noteworthy that the compound of Formula I is of very low toxicity and the effects observed in the abovementioned tests are observed at low doses, far removed from those producing any toxic manifestations. This is also true of the effect of the compound in preventing the seizures caused by the administration of electroshock; the compound is thus an anticonvulsant agent. For use as a central nervous system depressant or as an anticonvulsant the compound is formulated as capsules or compressed tablets containing from 50 to 300 mg. of the active ingredient together with the instromary binders, fillers and lubricants. Such dosage forms may be administered orally once to four times daily.

The following descriptive example will illustrate this invention but is not construed to limit it thereto.

EXAMPLE 1

9,10 - dihydro - 13-hydroxy-9,10-(methanoiminomethano) anthracen-11-one (I)

Sulfuric acid (1 N; 1000 ml.) is added to a stirred solution of 10,11-dihydro-10,11-epoxy-5H-dibenzo[a,d] cycloheptene-5-carboxamide (II; 80.0 g.) in dioxane (700 ml.). The mixture is kept at room temperature for 2 hours and most of the dioxane is removed under reduced pressure at about 40° C. The aqueous mixture is extracted with dichloromethane and the extract is washed with water, dried and evaporated. Crystallisation of the residual oil from a mixture of ethyl acetate, ethanol, and hexane gives a mixture of the isomeric syn- and anti-11-hydroxy - 10,11 - dihydro - 10,5 - (epoxymethano) - 5H-dibenzo[a,d]cyclohepten-13-ones, M.P. 130–172°. Evaporation of the mother liquors gives an oil which is crystallised from dioxane-ether mixture to yield the title compound, M.P. 223–224° (dec.). Analytical date confirms the empirical formula $C_{16}H_{13}NO_2$;

$\nu_{max.}^{Nujol}$ 3560, 3220, 3090, 1663, cm$^{-1}$ $\lambda_{max.}^{EtOH}$ 263, 270, m$\mu$ ($\epsilon$ 1416, 1598).

The NMR spectrum is also in accord with the given structure.

We claim:
1. 9,10-dihydro-13-hydroxy - 9,10(methanoiminomethano)anthracen-11-one.

2. The process of preparing 9,10-dihydro-13-hydroxy-9,10(methanoiminomethano)anthracen - 11 - one which comprises treating 10,11-dihydro-10,11-epoxy-5H-dibenzo[a,d]cycloheptene-5-carboxamide with a mineral acid.

References Cited

UNITED STATES PATENTS 3,493,560   2/1970   Dobson et al. _____ 260—239.3

HENRY R. JILES, Primary Examiner

R. T. BOND, Assistant Examiner

U.S. Cl. X.R.

424—244